United States Patent [19]

Actis et al.

[11] Patent Number: 5,247,161
[45] Date of Patent: Sep. 21, 1993

[54] BAR CODE SCANNING SYSTEM WITH CONVERTER MEANS AND MICROPROCESSOR MEANS CONTAINED IN A SINGLE INTEGRATED CIRCUIT

[75] Inventors: Robert J. Actis; Craig D. Cherry; Andrew P. Taussig, all of Eugene, Oreg.

[73] Assignee: Spectra-Physics, Inc., Wilmington, Del.

[21] Appl. No.: 817,060

[22] Filed: Jan. 6, 1992

Related U.S. Application Data

[63] Continuation of Ser. No. 488,107, Mar. 5, 1990, Pat. No. 5,144,118.

[51] Int. Cl.$^5$ ............................................. G06K 7/10
[52] U.S. Cl. ................................. 235/462; 235/436; 235/466
[58] Field of Search ........................ 235/436, 462, 466

[56] References Cited

U.S. PATENT DOCUMENTS

| | | | |
|---|---|---|---|
| 4,104,514 | 8/1978 | Sherer et al. ........................ | 235/466 |
| 4,679,154 | 7/1987 | Blanford ............................ | 235/462 X |
| 4,902,883 | 2/1990 | Poland .............................. | 235/462 |

*Primary Examiner*—Vincent P. McGraw
*Attorney, Agent, or Firm*—Killworth, Gottman, Hagan & Schaeff

[57] ABSTRACT

A system for scanning bar code labels and for providing data related thereto includes scanning means for optically scanning bar code labels and providing an electrical, binary scan signal in response thereto. The scanning means includes a scanner and a scanner controller, and an integrated circuit. The integrated circuit includes a converter means, responsive to the scanning means, for translating the electrical, binary scan signal into a related sequence of digital words. The integrated circuit further includes a microprocessor means, responsive to the converter means, for translating the related sequence of digital words into data. The microprocessor means has first and second microprocessor circuits for independently translating the sequence of digital words into data. The microprocessor means also has a random access memory for storing the appropriate software to control operation of the first and second microprocessor circuits.

21 Claims, 2 Drawing Sheets

BAR CODE SCANNING SYSTEM WITH CONVERTER MEANS AND MICROPROCESSOR MEANS CONTAINED IN A SINGLE INTEGRATED CIRCUIT

This is a continuation of application Ser. No. 07/488,107 filed Mar. 5, 1990, now U.S. Pat. No. 5,144,118.

BACKGROUND OF THE INVENTION

The present invention relates to bar code scanners, to label scanning and decoding systems of the type that are designed to read labels having information which may be presented in any one of a number of different codes commonly in use and, more particularly, to such a scanner system including an integrated circuit which determines the information encoded on the labels by analysis of a signal or signals indicating relative widths of the dark bars and interleaved white spaces. This system operates in a particularly rapid and efficient manner, in order to process data in real time, and provides a high degree of flexibility.

Labels bearing information in a number of different bar code formats are typically used in various applications. It is common, for example, to encode product identification information as a series of printed bars or dark areas, and interposed white spaces or light areas, on a product package or on a label affixed to a product package. Laser scanners are known in which a beam of laser light is swept in a scan pattern to find and read a bar code printed on a surface which is presented to the scanner. Bar code labels are used on a broad range of retail packages for check-out and inventory purposes. A scanner, located for example at the check-out station in a retail establishment, is used by a clerk to enter product identification data automatically into an associated computer system.

A scanner of this type includes a laser source, such as for example a gas discharge laser, which produces a low power laser beam. The beam then passes through appropriate optical lenses and is swept across the package surface by a motor-driven, rotating mirror assembly. A portion of the light reflected from the package surface returns through the optical lenses to a detector which provides an electrical binary signal in dependence upon the level of the reflected light. A signal processing system then analyzes the binary scan signal, providing data which is transmitted to the host computer.

The computer may then determine the total price of the products being purchased, as well as storing the identity of the purchased products for inventory and accounting purposes. The host computer may be located in the cash register associated with the scanner. Alternatively, a single host computer may service a number of scanners at a retail establishment.

While such an arrangement greatly enhances the efficiency of the check-out process in the retail establishment and additionally allows the accumulation of sales data which is important for proper management controls, difficulties are encountered in the scanning operation due to the nature of the products being scanned and the number of different bar codes currently in use. Packaging for various products is designed to make the products appealing to the consumer and, as a consequence, may include various graphics and text which, when scanned, produce an electrical scan signal which mimics that produced when a label having valid bar code symbols is scanned. Additionally, a number of different bar codes have come into popular use, and the scanner circuitry must be capable of recognizing and decoding labels printed in each of these codes. Further, the scanning speed of the moving laser beam is sufficiently high that the electrical binary scan signal must be analyzed rapidly to determine whether a bar code label has been scanned and, if so, the data encoded on the bar code label.

It is important that the scanner system be capable of accomplishing these tasks automatically, without intervention by the clerk, even when labels having different bar codes are affixed to products which are scanned. This presents substantial difficulties since bar codes now in common usage vary significantly in their formats. These codes include, for example, Code 3 of 9, Interleaved 2 of 5 Code, Codabar, Code 93, Code 128, the Universal Product Code (UPC), and the European Article Numbering (EAN) code.

While decoding system embodied in hardware, software, firmware, and combinations thereof have been utilized in the past, there is a need for a system for decoding a binary scan signal more quickly, more efficiently, and with greater flexibility, and a need for such a system including an integrated circuit specially designed for performing this task.

SUMMARY OF THE INVENTION

These needs are met by a system for scanning bar code labels and for providing data related thereto according to the present invention, including scanning means for optically scanning bar code labels and providing an electrical, binary scan signal in response thereto. The system further includes converter means, responsive to the scanning means, for translating the electrical, binary scan signal into a related sequence of digital words, and microprocessor means, responsive to the converter means, for translating the related sequence of digital words into data. The microprocessor means is programmable, and may include first and second microprocessor circuits for independently translating the sequence of digital words into data. The scanning means may consist of a scanner and a scanner controller. The converter means preferably includes a clock for providing a clock signal, a counter circuit, responsive to the electrical, binary scan signal and to the clock signal, for measuring the time between successive transitions of the scan signal and providing a digital word related thereto, and a first random access memory, responsive to the counter circuit, for storing successive digital words received from the counter circuit.

The clock may comprise a programmable oscillator for providing a clock signal of adjustable frequency in response to a frequency control command, whereby compensation may be provided for variations in the manufacture of the integrated circuit and for variations in operating conditions. The clock may include means for selecting an internal clock or an external oscillator. The clock may include a plurality of series connected inverter circuits. The clock may further include a frequency doubler circuit, whereby a selected internal or external source may supply a low frequency signal to the frequency doubler circuit to produce the clock signal. Additionally, the clock may include an external output such that the clock signal may be utilized with other circuitry. The frequency control command may be provided by the scanner controller.

The system may further comprise an auxiliary scan signal input to the converter means such that the scan signals from sources other than the scanner may be supplied to the converter means. Additionally, the system may comprise an alternate external clock input for supplying an externally generated clock signal to the clock.

The microprocessor means further comprises first and second program storage random access memories for storing control software to control operation of the first and second microprocessor circuits respectively. The program storage random access memories are preferably responsive to the scanner controller for storing control software supplied by the scanner controller.

The integrated circuit preferably further includes a second random access memory responsive to the first microprocessor circuit, and a third random access memory responsive to the second microprocessor circuit. The second and third random access memories store data translated by the first and second microprocessors, respectively, and may be accessed by the scanner controller.

The integrated circuit may further include an interface. The interface provides communication between the integrated circuit and the scanner controller.

Accordingly, it is an object of the invention to provide a system for scanning bar code labels and for providing data related thereto in an efficient, cost effective manner; to provide such a system in which a pair of microprocessors may be operated simultaneously; to provide such a system embodied on an integrated circuit chip; which includes a microprocessor which is controllable by software supplied by a scanner controller; and to provide such a system having flexibility in its operating frequency and manner of operation.

Other objects and advantages of the invention will be apparent from the following description, the accompanying drawings and the appended claims.

DETAILED DESCRIPTION OF THE PREFERRED EMBODIMENT

Figure 1:
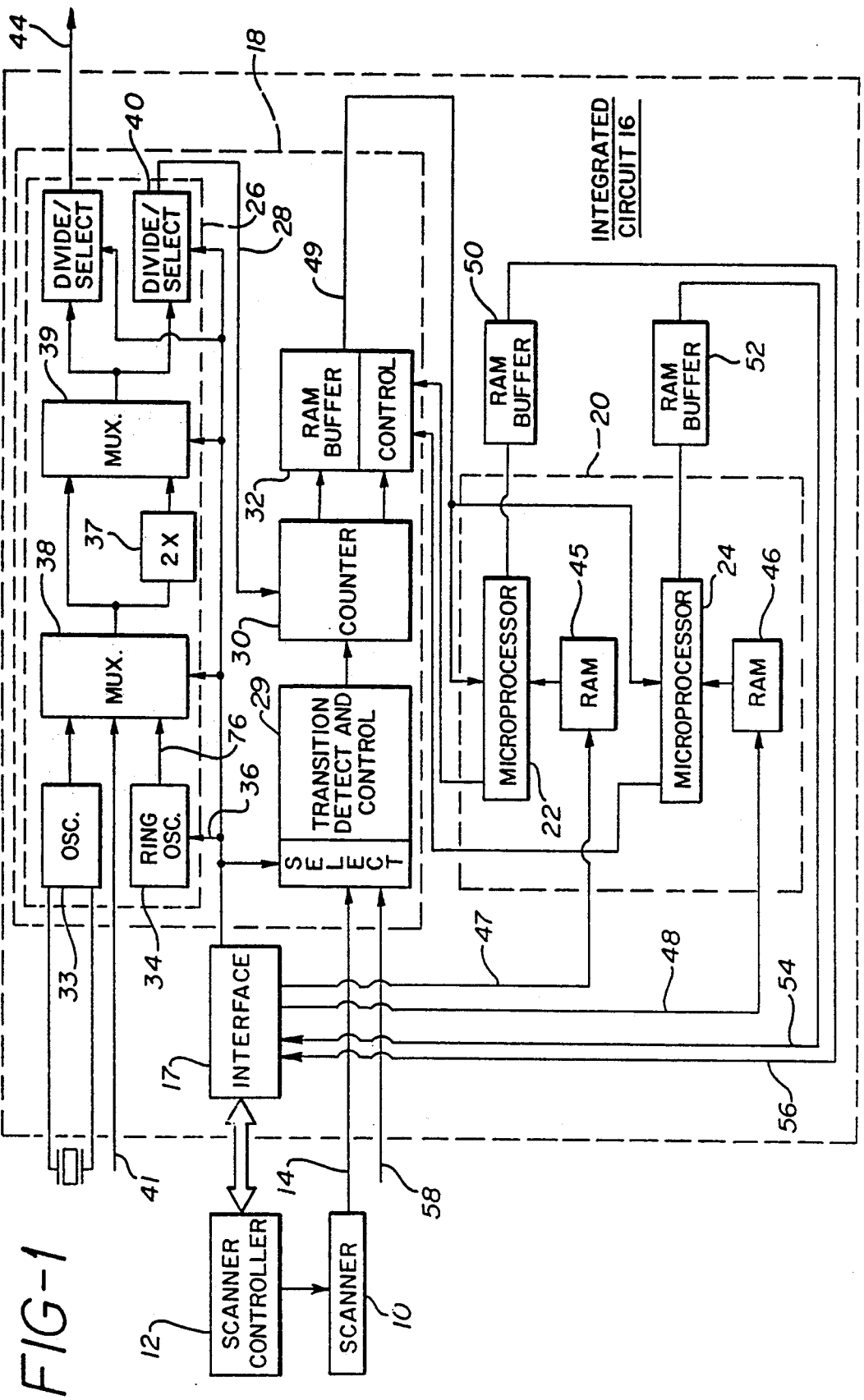
FIG. 1 is a block diagram of the system for scanning bar code labels and for providing data related thereto according to the present invention.

Reference is made to FIG. 1 which depicts the system of the present invention for scanning bar code labels and for providing data related thereto. The system has a scanning means, including a scanner 10 and a scanner controller 12, for optically scanning bar code labels and providing an electrical, binary scan signal on line 14 in response thereto. As is well known, bar code symbols, such as those used in the Universal Product Code, are generally characterized as a series of parallel light and dark areas of different widths. The various symbols are made up of different combinations and orderings of these light and dark areas.

The scanner 10 scans these bar code symbols on labels by detecting light which is reflected therefrom. The reflected light is incident upon a photo diode, or other optical detector and associated circuitry, which generates an electrical signal having a first level for dark bars and a second level for light spaces. Positive-going transitions and negative-going transitions occur in the electrical signal to signify transitions between the light and dark areas of the scanned symbols. The scanner 10 includes appropriate circuitry, such as disclosed in U.S. Pat. No. 4,749,879, issued Jun. 7, 1988, to Peterson, for processing the electrical signal so as to provide a scan signal on line 14 which has sharp transitions, and appropriate signal levels.

The system includes an integrated circuit 16 which is specially configured to determine the portion of the binary scan signal that is produced by scanning a bar code label, to determine the particular bar code in which the label is printed, and to determine the data which is encoded on the label. Circuit 16 includes an interface 17 which provides the primary communication between circuit 16 and scanner controller 12. The circuit 16 further includes converter means 18, responsive to the scanning means, for translating the electrical, binary scan signal on line 14 into a related sequence of digital words. Each word in this related sequence is a 13 bit binary number which defines the width of an associated light or dark area on the bar code label in terms of the duration between successive transitions of the scan signal on line 14. The integrated circuit 16 further includes a microprocessor means 20, which is responsive to the converter means, for translating the related sequence of digital words into the data encoded on the scanned bar code label. The microprocessor means 20 preferably includes first and second microprocessor circuits 22 and 24, respectively, for independently translating the sequence of digital words into data. It should be appreciated, however, that in some systems constructed according to the present invention only a single microprocessor means will be utilized.

The converter means 18 includes a clock 26 for providing a clock signal on line 28, and a counter circuit 30, responsive to the electrical, binary scan signal on line 14 and to the clock signal on line 28, for measuring the time between successive transitions of the clock signal and for providing a digital word related thereto. The converter means 18 further includes a first random access memory 32 which is responsive to the counter circuit 30, and which acts as a buffer to store successive digital words received from the counter circuit 30. As is clear, the scan signal on line 14 is converted into the series of 13 bit binary numbers by counting the number of cycles of the clock signal on line 28 which occur between successive transitions of the scan signal. Upon the completion of each counting operation, the resulting binary number is supplied to random access memory 32 and counter 30 is reset to permit the next counting operation to begin.

The clock 26 comprises a crystal controlled oscillator 33, and a programmable oscillator 34 which is responsive to the scanner controller 12 for providing an adjustable frequency clock signal on line 28 in response to a frequency control command supplied from the scanner controller 12 on line 36. The frequency adjustable oscillator 34 allows compensation for variations in the manufacture of the integrated circuit 16 and for variations in the conditions, such as for example voltage and temperature, under which the circuit 16 operates. By utilizing an internal oscillator, the number of system components and system cost are reduced, as is the possibility of undesirable electrical noise.

The clock 26 further includes a frequency doubler circuit 37 which is connected to receive the output from either oscillator 33 or oscillator 34 via multiplex circuit 38 and provide its output via multiplex circuit 39 and divide/select circuit 40 to counter 30. The divide/select circuit 40 may provide a clock signal received from multiplex circuit 39 directly to counter 30 or may reduce its frequency as determined by controller 12 to match data rates of various binary scan signals on line 14 or auxillary scan signals on line 58. If desired, an external circuit (not shown) may provide a low frequency signal on line 41 to the frequency doubler circuit 37 via multiplex circuit 38, producing a clock signal at twice the frequency for application to the counter circuit 30. This permits the use of lower frequency external signal, reducing the possibility of noise and reducing total system cost. It will be appreciated that the clock circuit 26 therefore permits the operation of the integrated circuit 16 to be synchronized to the operation of various input systems, such as an auxiliary scanner. The clock 26 also includes an external output 44 such that the clock signal produced by clock 26 may be utilized with other circuitry, such as additional integrated circuit chips.

The microprocessor means 20 further comprises first and second random access memories 45 and 46 for storing control software to control operation of the first and second microprocessor circuits, respectively. Various programs may be utilized to control operation of the microprocessors 22 and 24, depending upon the application to which the scanning system is put. Exemplary of such programs is the software disclosed in commonly assigned U.S. patent application Ser. No. 064,110, filed Jun. 18, 1987. Since the software is provided to memories 45 and 46 by interface 17 via lines 47 and 48, and may be altered or replaced if desired, maximum flexibility in the available modes of operation is achieved. This insures that bar codes developed in the future can be decoded by this system with only a change in the software being necessitated. The microprocessors 22 and 24 may operate simultaneously and independently on the same sequence of digital words received via line 49. Alternatively, the microprocessors 22 and 24 may operate simultaneously on different portions of the sequence of digital words. This allows for simultaneous, efficient and rapid decoding of multiple bar code types.

The integrated circuit 16 includes a third random access memory 50, responsive to the first microprocessor circuit 22, and a fourth random access memory 52, responsive to the second microprocessor circuit 24. The third and fourth random access memories 50 and 52 provide storage for data translated by the first and second microprocessors 22 and 24, respectively, prior to this data being accessed by scanner controller 12 through interface 17 via lines 54 and 56. This permits the scanner controller to perform other tasks while data is being accumulated.

The system of the present invention further includes an auxiliary scan signal input 58, permitting a scan signal to be supplied to the converter means 18 from another, external source. Such an auxiliary source may for example be a bar code scanning wand, a hand-held bar code scanner, or another auxiliary high speed scanner. The scanner controller 12 is signaled when activity is present on auxiliary scan signal input 58. As will be appreciated, the system of the present invention is advantageous in numerous respects. Since it is designed specifically for the function of translating a scan into associated data defining the information encoded on the label, its operation is efficient. Further, due to the various alternative modes of operation described above, the system is highly flexible.

Figure 2:
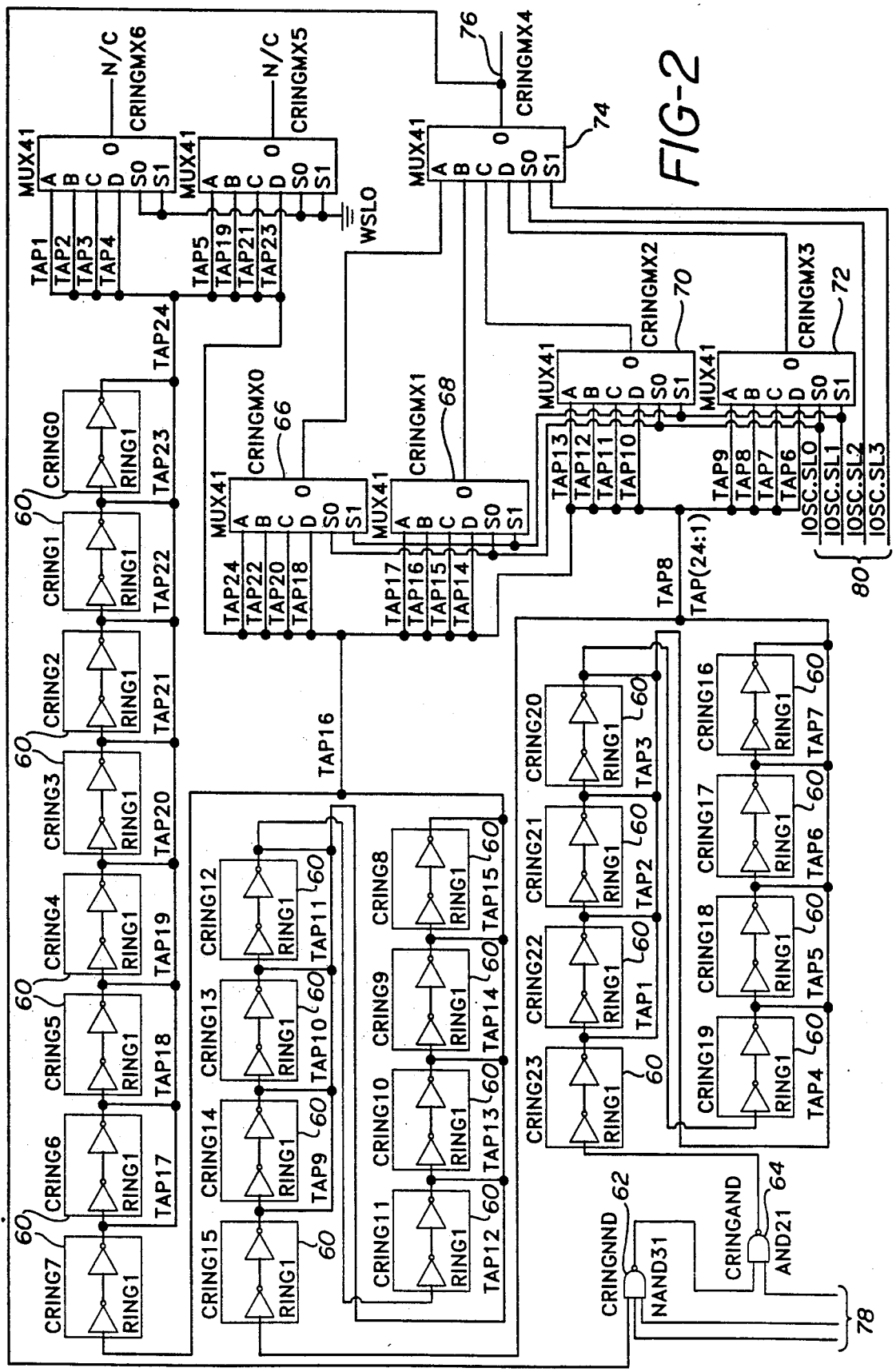
FIG. 2 is a schematic diagram of a controllable ring oscillator which is included in the system.

This flexibility is enhanced, as previously discussed, by incorporating a highly flexible clock circuit 26 which includes a ring oscillator circuit 34, more completely illustrated in FIG. 2. Circuit 34 has a plurality of series connected delay circuits 60 which are connected in a ring configuration with NAND gate 62, AND gate 64, and multiplex circuits 66, 68, 70, 72, and 74. An odd number of inversions is provided by this ring connection such that oscillation of the output on line 76 is maintained. NAND gate 62 and AND gate 64 are enabled via lines 78 to permit oscillation. The outputs from the various inverter circuits 60 may be supplied to line 76 and to NAND gate 62 from TAP6–TAP18, TAP20, TAP22, TAP24 under control of a command supplied on lines 80 to multiplex circuits 66–74. By this arrangement, the length of the ring is effectively varied and the frequency of the clock signal on line 76 is determined.

The flexibility of the circuit 16 may also be enhanced by interface circuit 17. If desired, circuit 17 may be configured to receive either INTEL or Motorola format inputs from scanner controller 12, permitting circuit 16 to function effectively with various scanner systems and controllers without the need for external circuit components.

Having described the invention in detail and by reference to the preferred embodiment thereof, it will be apparent that other modifications and variations are possible without departing from the scope of the invention defined in the appended claims.

What is claimed is:

1. A system for scanning bar code labels and for providing data related thereto, comprising:
   scanning means for optically scanning bar code labels and providing an electrical, binary scan signal in response thereto, and
   an integrated circuit including
      converter means, responsive to said scanning means, for translating said electrical, binary scan signal into a related sequence of digital words, and
      microprocessor means, responsive to said converter means, for translating said related sequence of digital words into data.

2. The system of claim 1 in which said converter means includes
   a clock for providing a clock signal,
   a counter circuit, responsive to said electrical, binary scan signal and to said clock signal, for measuring the time between successive transitions of said clock signal and providing a digital word related thereto, and
   a first random access memory, responsive to said counter circuit, for storing successive digital words received from said counter circuit.

3. The system of claim 2 in which said clock includes a frequency doubler circuit, whereby a clock signal may be increased in frequency.

4. The system of claim 2 in which said clock includes an external output such that said clock signal may be utilized with other circuitry.

5. The system of claim 2 in which said converter means contains a divider circuit such that said clock signal can be adjusted in frequency to match the rate at which said bar code labels are scanned.

6. The system of claim 1 further comprising an auxiliary scan signal input to said converter means such that scan signals from sources other than said scanner may be supplied to said converter means.

7. The system of claim 1 further comprising an alternate external clock input for supplying an externally generated clock signal to said clock.

8. The system of claim 1 in which said microprocessor means further comprises a program storage random access memory for storing control software to control operation of said microprocessor means.

9. The system of claim 1 in which said integrated circuit further comprises a random access memory, responsive to said microprocessor means, for providing storage for data translated by said microprocessor means.

10. The system of claim 1 in which said integrated circuit further includes an interface for providing communication with said scanner controller.

11. An integrated circuit for use in a system for scanning bar code labels and for providing data related thereto, such system including scanning means for optically scanning bar code labels and providing an electrical, binary scan signal in response thereto, said scanning means including a scanner and scanner controller, said integrated circuit comprising:

converter means, responsive to said scanning means, for translating said electrical, binary scan signal into a related sequence of digital words, and microprocessor means, responsive to said converter means, for translating said related sequence of digital words into data, said microprocessor means being programmable by said scanner controller for independently translating said sequence of digital words into data.

12. The integrated circuit of claim 11 in which said converter means includes a clock for providing a clock signal, a counter circuit, responsive to said electrical, binary scan signal and to said clock signal, for measuring the time between successive transitions of said clock signal and providing a digital word related thereto, and a first random access memory, responsive to said counter circuit, for storing successive digital words received from said counter circuit.

13. The integrated circuit of claim 12 in which said clock includes a frequency doubler circuit, whereby a low frequency signal may be provided to said frequency doubler circuit, producing a higher frequency clock signal for application to said counter circuit.

14. The integrated circuit of claim 12 in which said clock includes an external output such that said clock signal may be utilized with other circuitry.

15. The integrated circuit of claim 12 in which said converter means contains a divider circuit such that said clock signal can be adjusted in frequency to match the rate at which said bar code labels are scanned.

16. The integrated circuit of claim 11 further comprising an auxiliary scan signal input to said converter means such that scan signals from sources other than said scanner may be supplied to said converter means.

17. The integrated circuit of claim 11 further comprising an alternate external clock input for supplying an externally generated clock signal to said clock.

18. The integrated circuit of claim 11 in which said microprocessor means further comprises a random access memory means, responsive to said scanner controller, for storing control software to control operation of said microprocessor means.

19. A system for scanning bar code labels and for providing data related thereto, comprising:

scanning means for optically scanning bar code labels and providing an electrical, binary scan signal in response thereto, said scanning means including a scanner and scanner controller, and an integrated circuit, responsive to said scanning means, for providing said data in response to said binary scan signal, said integrated circuit including microprocessor means for translating a sequence of digital words related to said binary scan signal into said data, said microprocessor means including a first microprocessor circuit and a first program storage random access memory, responsive to said scanner controller, for storing control software received from said scanner controller, to control operation of said first microprocessor circuit.

20. The system of claim 19, in which said integrated circuit further comprises converter means, responsive to said scanning means, for translating said electrical, binary scan signal into said related sequence of digital words.

21. The system of claim 20 in which said converter means includes a clock for providing a clock signal.

* * * * *